United States Patent [19]

Hoffman, Jr.

[11] Patent Number: 4,487,297

[45] Date of Patent: Dec. 11, 1984

[54] CALIPER MOUNTING SUSPENSION

[75] Inventor: Charles T. Hoffman, Jr., Waynesville, Ohio

[73] Assignee: General Motors Corporation, Detroit, Mich.

[21] Appl. No.: 415,427

[22] Filed: Sep. 7, 1982

[51] Int. Cl.³ .............................................. F16D 65/02
[52] U.S. Cl. .................................. 188/73.45; 188/73.32
[58] Field of Search ............... 188/73.32, 73.39, 73.43, 188/73.44, 73.45

[56] References Cited

U.S. PATENT DOCUMENTS 4,171,035 10/1979 Takaaki .......................... 188/73.45
4,351,420 9/1982 Burgdorf ......................... 188/73.45

FOREIGN PATENT DOCUMENTS 72067 6/1977 Japan .............................. 188/73.45
12131 1/1982 Japan .............................. 188/73.45

Primary Examiner—Duane A. Reger
Attorney, Agent, or Firm—D. D. McGraw

[57] ABSTRACT

A disc brake torque-taking bracket has integral bolt-like extensions passing through openings in caliper housing ears. Boot seals are provided on both sides of the ears. This requires no mounting bolts or locking devices, permits non-critical caliper machining in the mounting area, and is easily assembled.

3 Claims, 4 Drawing Figures

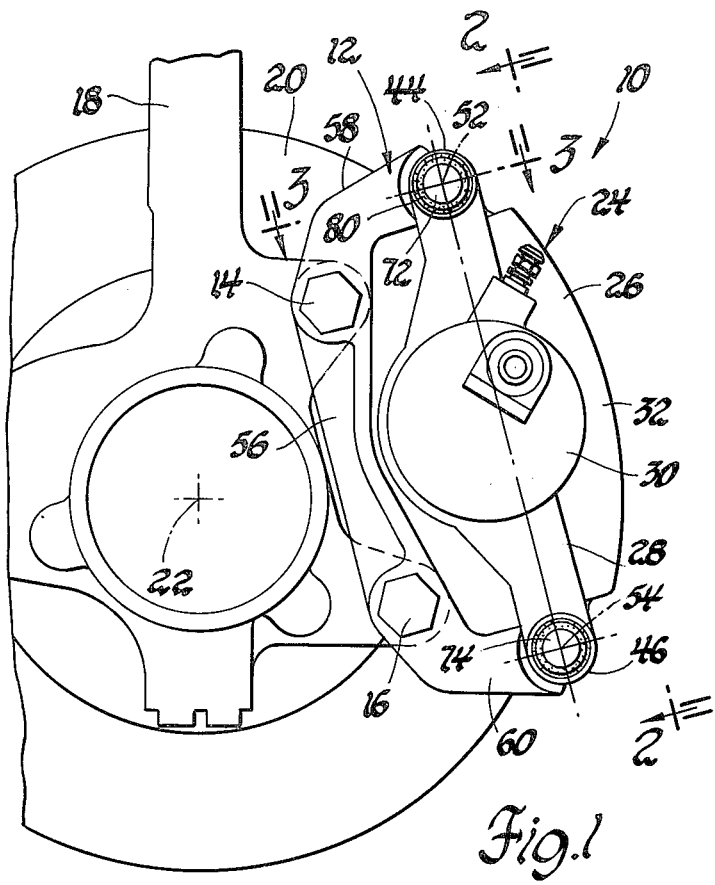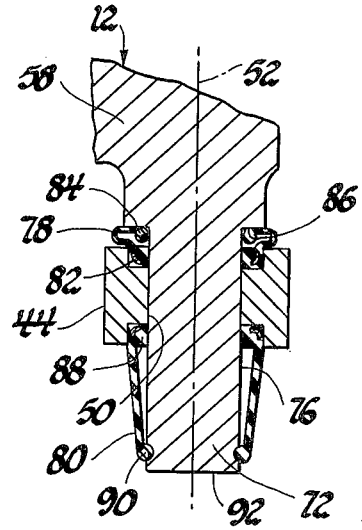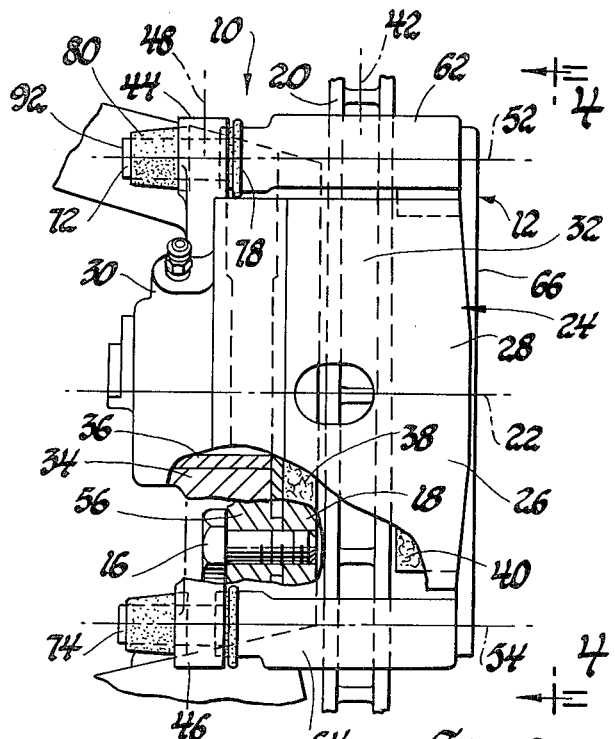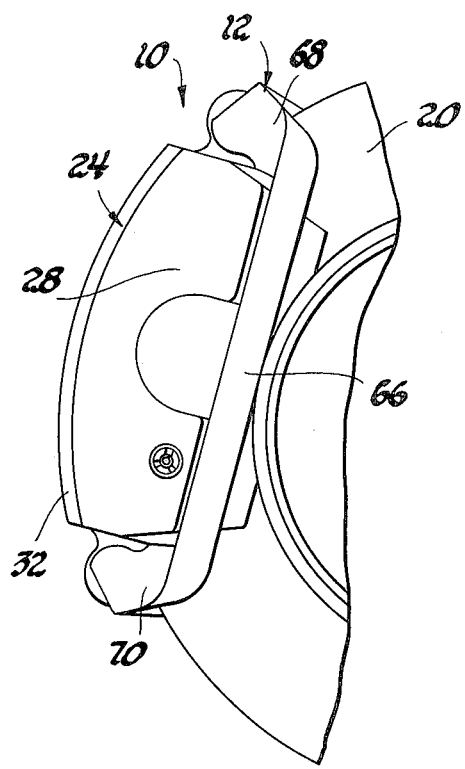

CALIPER MOUNTING SUSPENSION

The invention relates to a mounting arrangement for a disc brake sliding caliper, and more particularly to one in which the torque-taking mounting bracket has an integral extension passing through an opening provided in an ear formed as a part of the caliper housing. Preferably two such extensions and two such ears are used. Positive sealing boots are provided on both sides of each ear. The arrangement requires no mounting bolts or locking devices, permits non-critical caliper machining in the mounting area, and is easily assembled and disassembled.

IN THE DRAWING

FIG. 1 is an elevation view of a disc brake assembly embodying the invention, with parts broken away.

FIG. 2 is an elevation view of the disc brake assembly of FIG. 1, taken in the direction of arrows 2—2 of that Figure and having parts broken away and in section.

FIG. 3 is a fragmentary cross-section view of the mounting arrangement embodying the invention, and is taken in the direction of arrows 3—3 of FIG. 1.

FIG. 4 is an elevation view of the brake assembly of FIGS. 1 and 2, taken in the direction of arrows 4—4 of FIG. 2, and having parts broken away.

The disc brake assembly 10 includes a saddle-like mounting bracket 12 secured by bolts 14 and 16 to a non-rotatable support member 18, which is illustrated as being a steering knuckle of a vehicle. The disc 20 to be braked is attached for rotation with a vehicle wheel (not shown) and rotates about the disc axis 22. The slidable caliper assembly 24 is slidably mounted on bracket 12 as is more particularly described below. The caliper assembly includes a caliper housing 26 composed of an outboard leg 28, an inboard leg 30 and a bridge section 32 joining the legs. The inboard leg 30 is formed to include a cylinder 34 with a brake actuating piston 36 reciprocably received therein so that when brake actuating pressure is provided to the cylinder the brake assembly is actuated. Piston 36 acts on an inboard brake pad assembly 38 which engages a friction surface on one side of disc 20. An outboard brake pad assembly 40 is provided on outboard leg 28 so as to engage the friction surface on the other side of disc 20 when the brake assembly is actuated. The plane 42 of disc 20 is positioned between th brake pad assemblies and is perpendicular to the disc axis 22.

The inboard leg 30 has ears 44 and 46 formed therein at opposite ends thereof so that the plane 48 of the ears is parallel to the plane 42 and axially spaced therefrom. Ear 44 is shown in greater detail in FIG. 3 and ear 46 is similarly constructed. Ear 44 has a guide passage 50 formed therein with its axis 52 parallel to the disc axis 22 and perpendicular to planes 42 and 48. Axis 54 of the guide passage formed in ear 46 is similarly related to axis 22 and planes 42 and 48.

Mounting bracket 12 has an inboard side bar 56 through which bolts 14 and 16 extend, providing a bracket mounting section. Side bar 56 has upturned ends 58 and 60 which respectively connect to mounting bracket bridges 62 and 64. These bridges are positioned radially outward of the outer periphery of disc 20 and extend across the disc through plane 42. Mounting bracket 12 has an outboard side bar 66 positioned on the outboard side of disc 20 and provided with upturned ends 68 and 70 which also respectively join mounting bracket bridges 62 and 64. Bridges 62 and 64 each have an integral stud 72,74 extending inwardly relative to the disc 20. Studs 72 and 74 respectively extend through the guide passages of ears 44 and 46 so that the axes of the studs are respectively coincident with axes 52 and 54 when the brake assembly is in the assembled condition. As is better shown in FIG. 3, the support and guide surface 76 of stud 72 is in sliding and guiding relation with the wall of guide passage 50 of ear 44. Boots 78 and 80, each formed as flexible cylinders, are provided on either side of guide passage 50 of ear 44. One end 82 of boot 78 is secured in a recess in ear 44 and the other boot end 84 seals against the base of stud 72 at the shoulder 86 defining the point where stud 72 begins as a part of bridge 62. One end 88 of boot 80 is similarly positioned in a recess on the other side of ear 44. The other end 90 of boot 80 is sealingly mounted in an annular recess formed adjacent the outer end 92 of stud 72. A similar arrangement is provided for ear 46 and stud 74.

Each stud is of sufficient axial length between its shoulder 86 and its outer end 92 to remain in guiding relation with its associated guide passage throughout the operational life of the caliper assembly. Each stud also terminates axially at a length which, upon removal of the caliper assembly from the braking alignment with the disc 20, permits the caliper assembly to be slidably moved with respect to the mounting bracket sufficiently to slide the guide passages off of the studs to permit removal of the caliper assembly 24 from the mounting bracket 12. By use of this arrangement, the caliper assembly cannot be removed from the mounting bracket so long as it is installed in brake engageable relation to disc 20. It therefore requires no locking devices. The only critical caliper machining in the mounting area is the wall surface of guide passage 50, thus reducing the amount of expensive machining operations as compared to caliper assemblies in common use at this time.

The embodiments of the invention in which an exclusive property or privilege is claimed are defined as follows:

1. A disc brake sliding caliper mount comprising:
   a slidable caliper assembly having ear means extending therefrom in a plane substantially perpendicular to the axis of rotation of a disc to be braked and guide passage means formed through said ear means axially parallel to the axis of rotation;
   a mounting bracket having a mounting section, adapted to be fixed and to transmit brake torque from said caliper assembly to a non-rotatable support member, and mounting bracket bridge means extending across the disc and through the plane of the disc and integrally formed with said mounting section, said bridge means having integral end means forming guide stud means extending axially through said guide passage means in guiding relation thereto so that said caliper assembly is slidably guided on said stud means, said stud means being of sufficient axial length to remain in guiding relation with said guide passage means throughout the operation life of said caliper assembly, but terminating axially at a length which upon removal of said caliper assembly from braking alignment with the disc to be braked, said caliper assembly may be slidably moved sufficiently with respect to said mounting bracket to slide said guide passage means off of said stud means to permit removal of said caliper assembly from said mounting bracket.

2. The disc brake sliding caliper mount of claim 1 wherein said guide stud means form brake torque-taking members and wherein said caliper assembly transmits brake torque to said mounting bracket only through said guide stud means.

3. The disc brake sliding caliper mount of claim 1 wherein said mounting bracket bridge means comprises a pair of arcuately spaced bridges, each having one of said integral end means thereon forming one of said guide stud means, the two guide stud means so formed being axially parallel to and in arcuately spaced relation about the axis of rotation of the disc to be braked.

* * * * *